(12) United States Patent
See

(10) Patent No.: US 6,285,327 B1
(45) Date of Patent: *Sep. 4, 2001

(54) PARASITIC ELEMENT FOR A SUBSTRATE ANTENNA

(75) Inventor: Puay Hoe See, San Diego, CA (US)

(73) Assignee: QUALCOMM Incorporated, San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/063,814

(22) Filed: Apr. 21, 1998

(51) Int. Cl.[7] .......................................... H01Q 1/24
(52) U.S. Cl. ............................................ 343/702; 343/841
(58) Field of Search ............................ 343/700 MS, 702, 343/729, 833, 834, 841, 846, 829; H01Q 1/24, 1/36

(56) References Cited

U.S. PATENT DOCUMENTS

| | | | |
|---|---|---|---|
| 4,170,013 | * 10/1979 | Black | 343/700 MS |
| 5,008,681 | * 4/1991 | Cavallaro et al. | 343/700 MS |
| 5,300,938 | 4/1994 | Maroun et al. | 343/702 |
| 5,335,366 | * 8/1994 | Daniels | 455/89 |
| 5,394,160 | 2/1995 | Iwasaki et al. | 343/702 |
| 5,572,223 | * 11/1996 | Phillips et al. | 343/702 |
| 5,642,120 | 6/1997 | Fujisawa | 343/702 |
| 5,650,790 | 7/1997 | Fukuchi et al. | 343/702 |
| 5,678,216 | 10/1997 | Matai | 455/269 |
| 5,691,732 | 11/1997 | Tsuru et al. | 343/745 |

FOREIGN PATENT DOCUMENTS

| | | | |
|---|---|---|---|
| 0246026 | 11/1987 | (EP) | H01Q/1/24 |
| 0655797 | 5/1995 | (EP) | H01Q/19/00 |
| 0872912 | 10/1998 | (EP) | H01Q/21/24 |

* cited by examiner

*Primary Examiner*—Tho Phan
(74) *Attorney, Agent, or Firm*—Philip R. Wadsworth; Gregory G. Ogrod; Raymond B. Hom

(57) ABSTRACT

A parasitic element for use with an internal antenna in a wireless device. Generally, the antenna is a substrate antenna with one or more conductive traces supported on a substrate and mounted offset from a ground plane associated with the wireless device. One or more signal or power transfer conductors, cables, or signal feeds are positioned immediately adjacent to the antenna, which are capable of coupling signals into the antenna which picks-up energy from fields around or emanating from the conductors. Alternatively, the conductors intercept a portion of the energy being transferred into the antenna. The parasitic patch element employs a thin conductive structure which is placed adjacent to, over or under those conductors, reduces a substantial portion of energy from coupling between the conductors and antenna by altering the resonant or energy coupling characteristics of the conductors. The parasitic element inhibits transfer of energy between the conductors and the antenna, which increases overall device gain. In addition, the parasitic element and the parasitic coupling of the parasitic element to the ground plane, increases the gain and bandwidth of the wireless devices. The parasitic element can be manufactured from a variety of materials and in a variety of shapes and be installed using a variety of known techniques for positioning and installing thin conductive or metallic layers of material.

13 Claims, 15 Drawing Sheets

PARASITIC ELEMENT FOR A SUBSTRATE ANTENNA

BACKGROUND OF THE INVENTION

I. Field of the Invention

The present invention relates generally to antennas for wireless devices, and more specifically, to a internally mounted antennas. The invention further relates to internal substrate antennas for wireless devices, with parasitic elements having improved energy coupling characteristics, and gain and bandwidth for the wireless devices.

II. Description of the Related Art

Antennas are an important component of wireless communication devices and systems. Although antennas are available in numerous different shapes and sizes, they each operate according to the same basic electromagnetic principles. An antenna is a structure associated with a region of transition between a guided wave and a free-space wave, or vice versa. As a general principle, a guided wave traveling along a transmission line which opens out will radiate as a free-space wave, also known as an electromagnetic wave.

In recent years, with an increase in use of personal wireless communication devices, such as hand-held and mobile cellular and personal communication services (PCS) phones, the need for suitable small antennas for such communication devices has increased. Recent developments in integrated circuits and battery technology have enabled the size and weight of such communication devices to be reduced drastically over the past several years. One area in which a reduction in size is still desired is communication device antennas. This is due to the fact that the size of the antenna can play an important role in decreasing the size of the device. In addition, the antenna size and shape impacts device aesthetics and manufacturing costs.

One important factor to consider in designing antennas for wireless communication devices is the antenna radiation pattern. In a typical application, the communication device must be able to communicate with another such device or a base station, hub, or satellite which can be located in any number of directions from the device. Consequently, it is essential that the antennas for such wireless communication devices have an approximately omnidirectional radiation pattern, or a pattern that extends upward from a local horizon.

Another important factor to be considered in designing antennas for wireless communication devices is the antenna's bandwidth. For example, wireless devices such as phones used with PCS communication systems operate over a frequency band of 1.85–1.99 GHz, thus requiring a useful bandwidth of 7.29 percent. A phone for use with typical cellular communication systems operates over a frequency band of 824–894 MHz, which requires a bandwidth of 8.14 percent. Accordingly, antennas for use on these types of wireless communication devices must be designed to meet the appropriate bandwidth requirements, or communication signals are severely attenuated.

One type of antenna commonly used in wireless communication devices is the whip antenna, which is easily retracted into the device when not in use. There are, however, several disadvantages associated with the whip antenna. Often, the whip antenna is subject to damage by catching on objects, people, or surfaces when extended for use, or even when retracted. Even when the whip antenna is designed to be retractable in order to minimize such damage, it can still require a minimum device housing dimension when retracted that is larger than desired.

Whip antennas are often used in conjunction with short helical antennas which are activated when the whip is retracted into the phone. The helical antenna provides the same radiator length in a more compact space to maintain appropriate radiation coupling characteristics. While the helical antenna is much shorter, it still protrudes a substantial distance from the surface of the wireless device impacting aesthetics and catching on other objects. To position such an antenna internal to the wireless device would require a substantial volume, which is undesirable. In addition, such helical antennas seem to be very sensitive to hand loading by wireless device users.

Another type of antenna which might appear suitable for use in wireless communication devices is a microstrip or stripline antenna. However, such antennas suffer from several drawbacks. They tend to be much larger than desired, suffer from lower bandwidth, and lack desirable omnidirectional radiation patterns.

As the term suggests, a microstrip antenna includes a patch or a microstrip element, which is also commonly referred to as a radiator patch. The length of the microstrip element is set in relation to the wavelength $\lambda_0$ associated with a resonant frequency $f_0$, which is selected to match the frequency of interest, such as 800 MHz or 1900 MHz. Commonly used lengths of microstrip elements are half wavelength ($\lambda_0/2$) and quarter wavelength ($\lambda_0/4$). Although, a few types of microstrip antennas have recently been used in wireless communication devices, further improvement is desired in several areas. One such area in which a further improvement is desired is a reduction in overall size. Another area in which significant improvement is required is in bandwidth. Current patch or microstrip antenna designs do not appear to obtain the desired 7.29 to 8.14 percent or more bandwidth characteristics desired for use in most communication systems, in a practical size.

Conventional patch and strip antennas have further problems when placed near the extensive ground planes found within most wireless devices. The ground planes can alter the resonant frequency, creating a non-repeatable manufactured design. The minimum surface area also prevents mounting in a fashion that optimizes the radiation patterns. In addition, "hand loading", that is, placement of a user's hand near the antenna dramatically shifts the resonant frequency and performance of the antenna.

Radiation patterns are extremely important not only for establishing a communication link as discussed above, but also in relation to government radiation standards for wireless device users. The radiation patterns must be controlled or adjusted so that a minimum amount of radiation can be absorbed by device users. There are governmental standards established for the amount of radiation that can be allowed near the wireless device user. One impact of these regulations is that internal antennas cannot be positioned in many locations within a wireless device because of theoretical radiation exposure for the user. However, as stated above, when using current antennas in other locations, ground planes and other structures often interfere with their effective use.

With the above problems in mind a new type of antenna referred to as a substrate antenna has been developed to provide an internal antenna for wireless devices having appropriate bandwidth characteristics along with reduced size, adequate gain, and reduced response to or impact from hand loading, or similar problems encountered within the art. This type of antenna is disclosed in copending U.S. patent application Ser. No. 09/028,510 entitled "Substrate Antenna" filed on Feb. 23, 1998, which is incorporated herein by reference.

Although the substrate antenna advances the art of internal antennas and solves several problems in the art, there are some situations in which the antenna does not achieve desired gain or energy distribution conditions. That is, the antenna directs or couples radiation into undesired modes or directions, reducing the antenna gain. In addition, substrate and other types of small internal antennas are also negatively impacted by being positioned adjacent to various noise sources within the wireless device. When placed inside a wireless device the antenna may be positioned relatively close to conductors used to transfer signals or power. Antenna gain and wireless device sensitivity can decrease due to signals or signal noise being coupled into the antenna from these conductors or various sources within the wireless device.

Therefore, a new antenna structure and technique for manufacturing and mounting antennas within wireless devices is needed to achieve internal antennas having desired gain and sensitivity or reduced noise characteristics.

SUMMARY

In view of the above and other problems found in the art relative to manufacturing internal antennas for wireless devices, one purpose of the present invention is to decrease the interaction of an internal antenna with other elements or conductors in a wireless device, which otherwise degrades performance.

A second purpose of the invention is to increase or maintain a desirable level of gain for an internal antenna in a wireless device.

A third purpose of the invention is to increase the bandwidth for an internal antenna in a wireless device.

One advantage of the invention is that it provides a physically small internal antenna while maintaining desired operating characteristics.

These and other purposes, objects, and advantages are realized in a parasitic element for use with an internal antenna in a wireless communication device that has one or more conductors or feeds for signals or power transfer located adjacent to the antenna. The parasitic element is generally formed by disposing at least one layer of conductive material adjacent to, over or under, one or more of the conductors in a region adjacent to the antenna. The parasitic element has a preselected width relative to the conductors, and a preselected length along the conductors which is sufficient to prevent a substantial amount of energy from being coupled between the antenna and conductors.

A preferable internal antenna is a substrate antenna which includes one or more radiator traces supported on a dielectric substrate of predetermined thickness. Appropriate dimensions are selected for trace length and width, based on wavelengths of interest for the wireless device, and space allocated. In preferred embodiments, conductive shielding material is disposed adjacent to and surrounding a predetermined portion of the trace to provide a zero current level for the near field radiation pattern. The supporting substrate is mounted offset from and generally perpendicular to a ground plane associated with circuits and components within the device, with which the antenna is being used. The substrate antenna employs a very thin and compact structure which provides appropriate bandwidth. Antenna compactness and a greater variety of useful shapes allow the substrate antenna to be used very efficiently as an internal antenna for wireless devices.

However, the wireless device typically uses various signal or power transfer conductors which extend between preselected signal processing elements and power sources and have a portion located immediately adjacent to the antenna, which is positioned over or next to the conductors. In preferred embodiments, positioning the parasitic element adjacent to, over, or under one or more of the conductors in a region located adjacent to the antenna acts to prevent a certain amount of noise from being coupled from the conductors into the antenna. The parasitic element or patch is formed adjacent to the antenna to create a separation of charge across the slot or separation between the antenna and the ground plane of the wireless device. The parasitic element increases the effective or virtual area of the antenna thereby increasing the gain and bandwidth of the wireless device, by about 0.8 to 1.5 dB. The sensitivity of the wireless communication device is increased by reducing noise on the antenna.

Parasitically coupling the parasitic element to the ground plane through the conductors, further increases the gain and bandwidth of the wireless device. In this embodiment, the gain increases by about 0.8 to 1.5 dB. The parasitic element and parasitic coupling increases the bandwidth of the wireless devices by a factor of at least 1.5.

In preferred embodiments, the parasitic element is formed by one or more layers of conductive material such as copper, brass, aluminum or silver. The electrically conductive material can be placed over conductors located adjacent to the antenna, and is coupled to a ground potential for the wireless device. The parasitic element preferably covers conductors as completely as practical depending on the amount of energy or radiation to be inhibited. The size or area of the conductive material used to form the parasitic element can also be configured or adjusted to increase the effective area and corresponding bandwidth of the antenna by a preselected amount.

In preferred embodiments, the conductive material is manufactured as a patch of thin electrically conductive material which can be placed over conductors located adjacent to the antenna. This patch can be formed with a substantially rectangular shape, a substantially circular shape, a substantially triangular shape, or a complex geometric shape, and is preferably formed or manufactured to be at least twice as wide as the conductors.

In further embodiments of the invention, multiple layers of conductive material can be used either directly on each other, or interleaved with other layers of material or the conductors. In addition, multiple patches can be used to cover a desired region.

BRIEF DESCRIPTION OF THE DRAWINGS

The present invention is described with reference to the accompanying drawings, in which like reference numbers generally indicate identical, functionally similar, and/or structurally similar elements, the drawing in which an element first appears is indicated by the leftmost digit(s) in the reference number, and wherein:

FIG. 8b illustrates a side cross sectional view of the parasitic patch of FIG. 8a.

DETAILED DESCRIPTION OF PREFERRED EMBODIMENTS

Figure 1A:
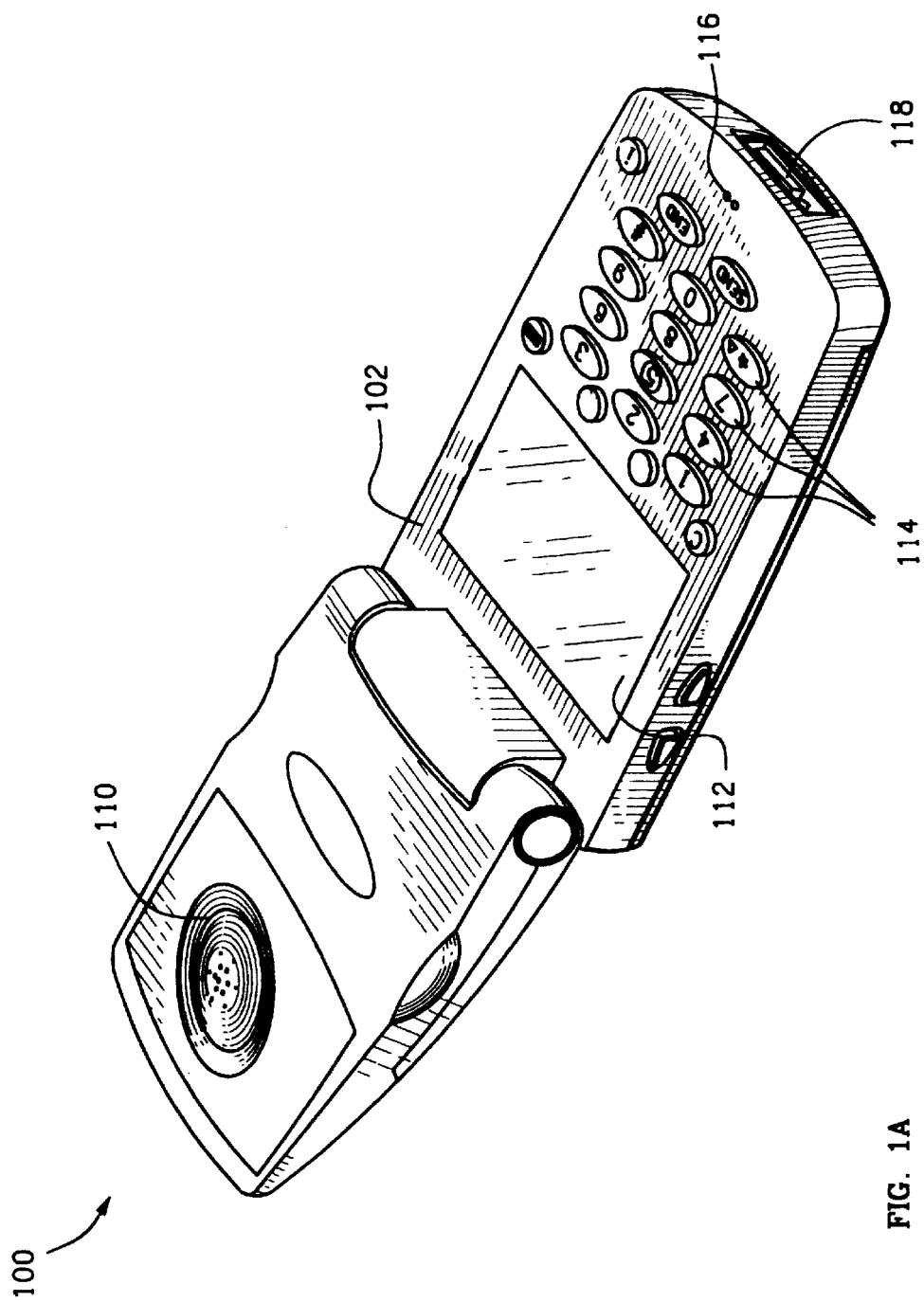
FIGS. 1a and 1b illustrate perspective and side views of a wireless telephone having a whip and an external helical antenna.

While a conventional microstrip antenna such as the inverted "F" antenna possesses some characteristics that make it potentially usable in personal communication devices, further improvement in other areas is still needed in order to make this type of antenna useful in wireless communication devices, such as cellular and PCS phones. One such area in which further improvement is desired is in bandwidth. Generally, PCS and cellular phones require a bandwidth greater than currently available with microstrip antennas, or practical size, in order to operate satisfactorily.

Another area in which further improvement is desired is the size of a microstrip antenna. For example, a reduction in the size of a microstrip antenna would make a wireless communication device in which it is used more compact and aesthetic. In fact, this might even determine whether or not such an antenna can be used in a wireless communication device at all. A reduction in the size of a conventional microstrip antenna is made possible by reducing the thickness of any dielectric substrate employed, or increasing the value of the dielectric constant, thereby shortening the necessary length. This, however, has the undesirable effect of reducing the antenna bandwidth, thereby making it less suitable for wireless communication devices.

Furthermore, the field pattern of conventional microstrip antennas, such as patch radiators, is typically directional. Most patch radiators radiate only in an upper hemisphere relative to a local horizon for the antenna. This pattern moves or rotates with movement of the device and can create undesirable nulls in coverage. Therefore, microstrip antennas have not been very desirable for use in many wireless communication devices.

A substrate antenna provides one solution to the above and other problems. The substrate antenna provides appropriate bandwidth and a reduction in size over other antenna designs while retaining other characteristics that are desirable for use in wireless communication devices. The substrate antenna can be built near the top surface of a wireless or personal communication device such as a portable phone or may be mounted adjacent to or behind other elements such as support posts, I/O circuits, keypads, and so forth in the wireless device. The substrate antenna can also be built directly into, such as by being embedded within plastic forming a housing, or onto a surface of the wireless device.

Unlike either a whip or external helical antenna, a substrate antenna, like other internal antennas, is not susceptible to damage by catching on objects or surfaces. This type of antenna also does not consume interior space needed for advanced features and circuits, nor require large housing dimensions to accommodate when retracted. Furthermore, the substrate antenna radiates a nearly omnidirectional pattern, which makes it suitable in many wireless communication devices.

In a broad sense, the invention can be implemented in any wireless device, such as a personal communication device, wireless telephones, wireless modems, facsimile devices, portable computers, pagers, message broadcast receivers, and so forth. One such environment is a portable or handheld wireless telephone, such as that used for cellular, PCS or other commercial communication services. A variety of such wireless telephones, with corresponding different housing shapes and styles, are known in the art.

FIG. 1 illustrates a typical wireless telephone used in wireless communication systems, such as the cellular and PCS systems discussed above. The phone illustrated in FIG. 1 (1a and 1b) is a "clam shell" shaped or folding body type phone. This phone is typical of advanced ergonomically designed wireless telephones which are used in wireless communication systems, such as the cellular and PCS systems discussed above. These phones are used for purposes of illustration only, since there are a variety of wireless devices and phones, and associated physical configurations, including this and other types or styles, in which the present invention may be employed, as will be clear from the discussion below.

Figure 1B:
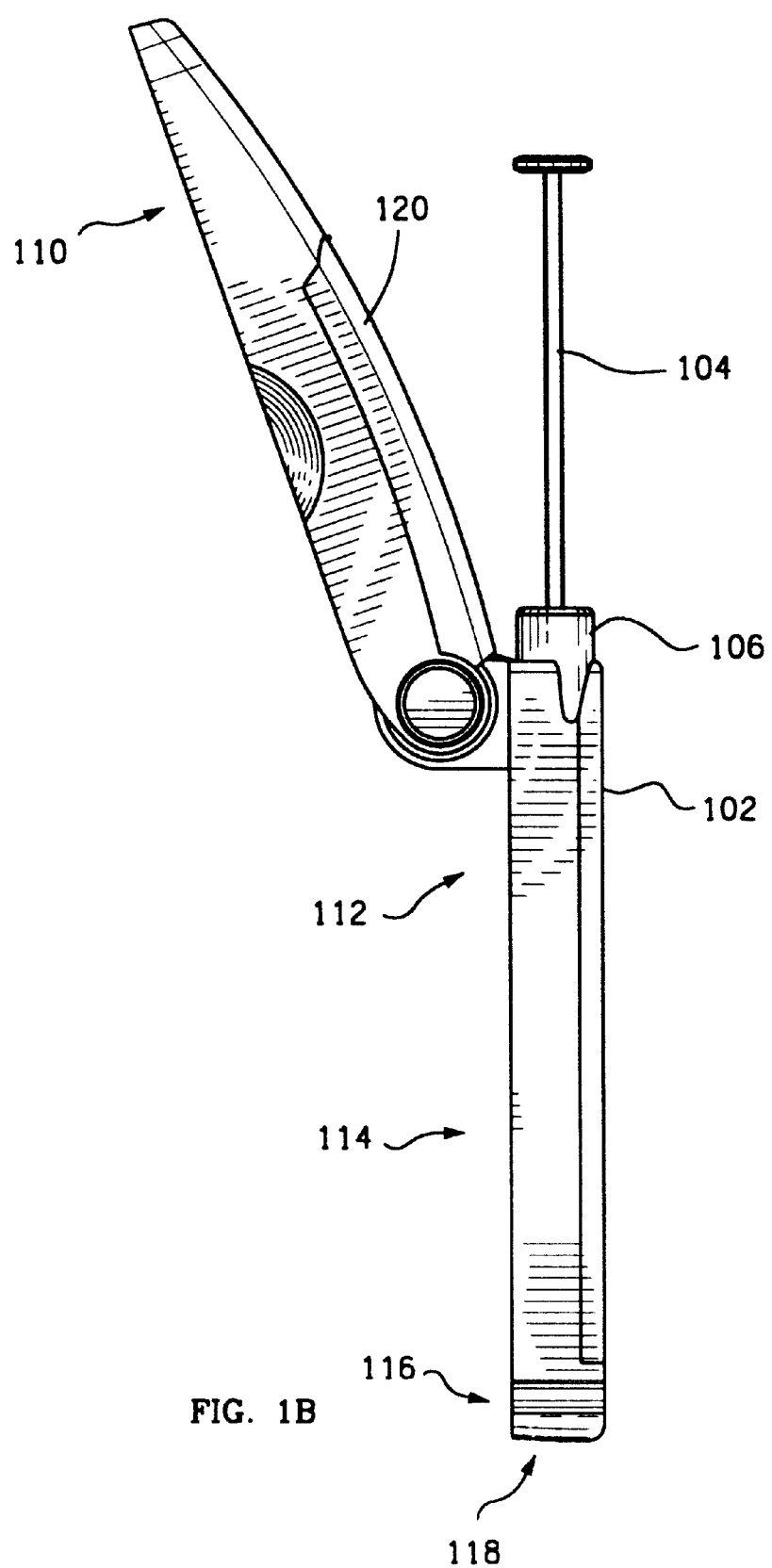

In FIGS. 1a and 1b, a phone 100 is shown having a main housing or body 102 supporting a whip antenna 104 and a helical antenna 106. Antenna 104 is generally mounted to share a common central axis with antenna 106, so that it extends or protrudes through the center of helical antenna 106 when extended, although this is not required for proper operation. These antennas are manufactured with lengths appropriate to the frequency of interest or of use for the particular wireless device on which they are used. Their specific design is well known and understood in the relevant art.

The front of housing 102 is also shown supporting a speaker 110, a display panel or screen 112, a keypad 114, and a microphone or microphone opening 116, and a connector 118. In FIG. 1b antenna 104 is in an extended position typically encountered during wireless device use, while in FIG. 1a antenna 104 is shown retracted into housing 102 (not seen due to viewing angle). Also visible in this view is a battery or power pack 120 installed in an upper portion of the wireless phone.

As discussed above, whip antenna 104 has several disadvantages. One, is that it is subject to damage by catching on other items or surfaces when extended during use. Antenna 104 also undesirably consumes interior space in such a manner as to interfere with placement of components for advanced features. In addition, antenna 104 may require minimum housing dimensions when retracted that are unacceptably large. Antenna 106 also suffers from catching on other items or surfaces, and cannot be retracted into the phone housing 102. In addition, antenna 106 is highly susceptible to loading or resonant frequency shifting due to contact with a device user's hand.

The use of the present invention is described in terms of this exemplary wireless phone, for purposes of clarity and convenience only. It is not intended that the invention be limited to application in this example environment. After reading the following description, it will become apparent to a person skilled in the relevant art how to implement the invention in alternative environments. In fact, it will be clear that the present invention can be utilized in other wireless communications devices, such as, but not limited to, portable facsimile machines and computers with wireless communications capabilities, and so forth, and with some non-substrate antennas.

Figure 2A:
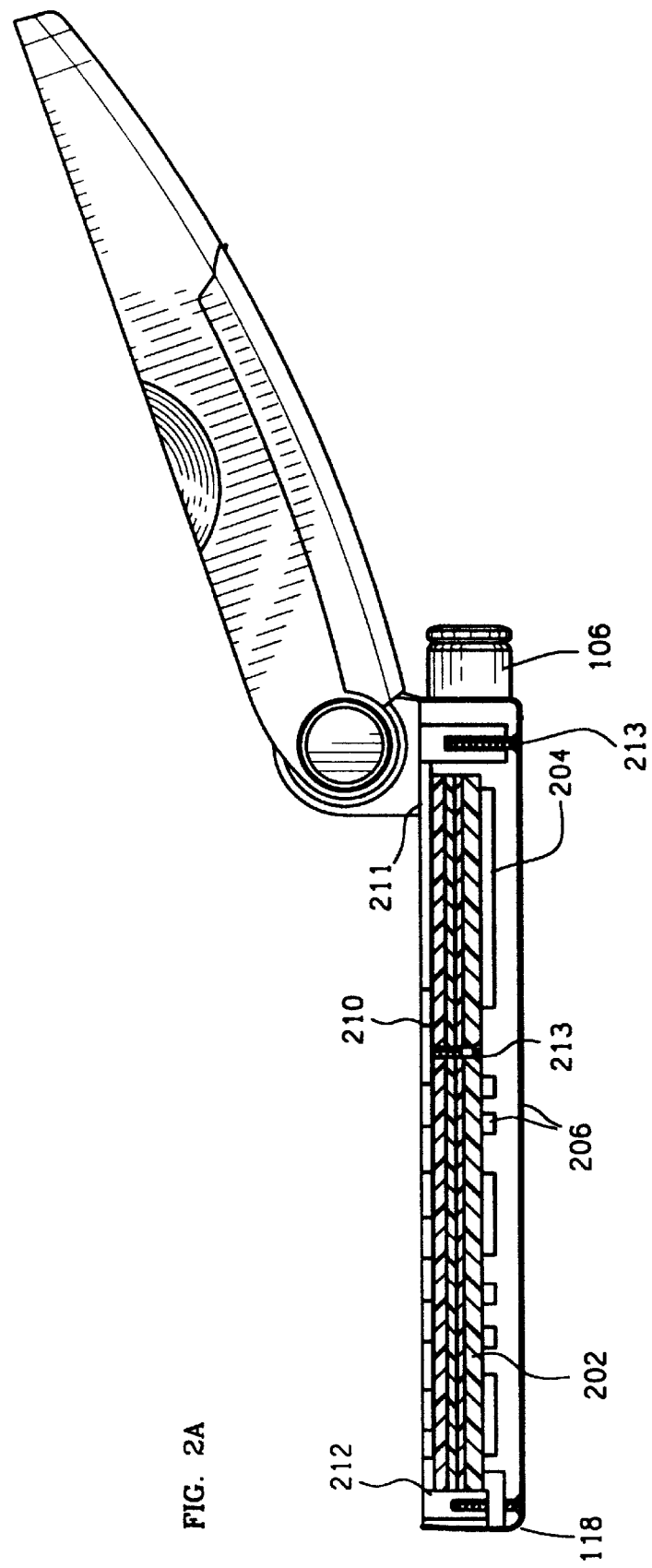
FIGS. 2a and 2b illustrate side and rear cross sectional views of the telephone of FIG. 1b with exemplary internal circuitry.
Figure 2B:
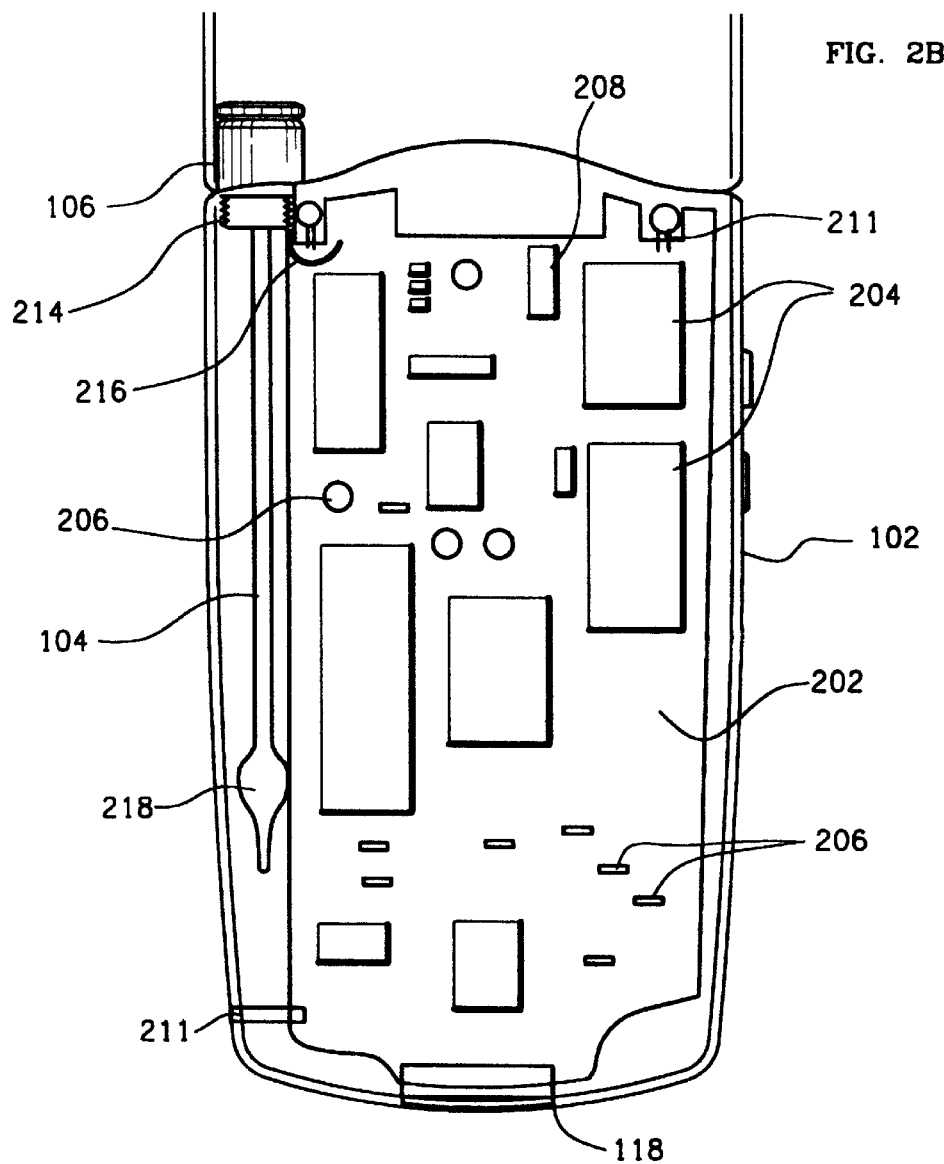

A typical wireless phone has various internal components generally supported on one or more circuit broads for performing the various functions needed or desired. FIGS. 2a and 2b are used to illustrate the general internal construction of a typical wireless phone. FIG. 2a illustrates a cross section of the phone shown in FIG. 1b when viewed from one side, to see how circuitry or components are supported within housing 102. FIG. 2b illustrates a cutaway of the same phone as viewed from the back, opposite side to the keypad, to see the relationship of the circuitry or components typically found within housing 102.

In FIGS. 2a and 2b, a circuit board 202 is shown inside of housing 102 supporting various components such as integrated circuits or chips 204, discrete components 206, such as resistors and capacitors, and various connectors 208. The panel display and keyboard are typically mounted on the reverse side of board 202, with wires and connectors (not shown) interfacing the speaker, microphone, or other similar elements to the circuitry on board 202. Antennas 104 and 106 are positioned to one side and are connected to circuit board 202 using special wire connectors, clips, or ferrules 214 and conductors or wires 216 intended for this purpose.

In a typical phone, a metallic ferrule 214 is used on the bottom of helical antenna 106 to mount that antenna in place on housing 102. The whip antenna is mounted to slid within the helical antenna, using a wider tip on top and an expanded portion 218 on the bottom to constrain it to move within helical antenna 106. Portion 218 of antenna 104 is also conductive and when the antenna is raised, generally makes electrical contact with ferrule 214. Signals are transferred through wire 216 to ferrule 214 and portion 218 to antenna 106.

Typically, a predetermined number of support posts or stands 210 are used in housing 102 for mounting circuit boards or other components within the housing. One or more support ridges or ledges 211 can also be used to support circuit boards. These posts can be formed as part of the housing, such as when it is formed by injection molding plastic, or otherwise secured in place, such as by using adhesives or other well known mechanisms. In addition, there are typically one or more additional fastening posts 212 which are used to receive screws, bolts, or similar fasteners 213 to secure portions of housing 102 to each other. That is, housing 102 is manufactured using multiple parts or a main body portion and a cover over the electronics. Fastening posts 212 are then used to receive elements 213 used to secure the housing portions together. The present invention easily accommodates or accounts for a variety of posts 210 or 212, while still providing a very efficient internal antenna design.

As seen in the enlarged view of FIG. 2b, circuit board 202 generally is manufactured as a multiple layer circuit board having several alternating layers of conductors and dielectric substrate bonded together to form a fairly complex circuit interconnection structure. Such boards are well known and understood in the art. As part of the overall structure, board 202 has at least one, and sometimes more, ground layers or ground planes, either on a bottom most surface or embedded within the board at an intermediate position.

It has been recognized that due to the manner in which the antennas in a wireless device excite currents in the ground plane, the larger less useful antennas can be replaced by a smaller more compact antenna element provided it is positioned appropriately with respect to the ground plane of the wireless device. This led to the creation and development of a substrate antenna as disclosed in the copending application discussed above.

Figures 3A, 3B, 3C:
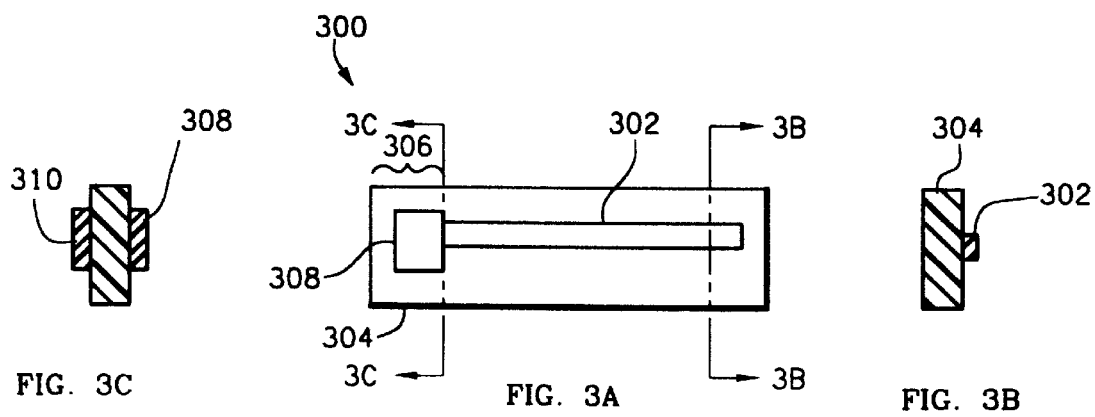
FIGS. 3a–3c illustrate a substrate antenna found useful in the telephone of FIG. 1.

An exemplary substrate antenna 300 is shown in the top and side views of FIGS. 3a–3c. In FIGS. 3a and 3b, substrate antenna 300 includes a conductive trace 302, also referred to as a strip or elongated conductor, a dielectric support substrate 304 and a signal feed region 306. Conductive trace 302 can be manufactured as more than one trace electrically connected together in series to form the desired antenna radiator structure. Trace 302 is electrically connected to a conductive pad 308 in signal feed region 306 at or adjacent to one end of substrate 304.

Substrate 304 is manufactured from a dielectric material or substrate, such as a circuit board or flexible material known for such uses. For example, a small fiberglass based printed circuit board (PCB) could be used. Those skilled in the art of electronics and antenna design are very familiar with the various products available from which to manufacture an appropriate antenna substrate, based on desired dielectric properties or antenna bandwidth characteristics.

The trace is manufactured from a conductive material such as, for example, copper, brass, aluminum, silver or gold, or other conductive materials or compounds known to be useful in manufacturing antenna elements. This could include conductive materials embedded within plastic or conductive epoxies, which can also act as the substrate. Trace material may be deposited using known techniques such as, but not limited to, standard photo-etching of a conductive material on a dielectric substrate; plating or otherwise depositing a conductive material on a substrate; or positioning a thin plate of conductive material on a support substrate using adhesives or the like. In addition, known coating or deposition techniques can be used to deposit metallic or conductive material on a plastic support substrate, which can be shaped as desired.

The length of trace 302 primarily determines the resonant frequency of substrate antenna 300, and is sized appropriately for a particular operating frequency. A conductive element, trace or traces, that is approximately one quarter of an effective wavelength ($\lambda$) for the frequency of interest is generally used. Those skilled in the art will readily recognize the benefits of making the length slightly greater or less than $\lambda/4$, for purposes of matching the impedance to corresponding transmit or receive circuitry. In addition, connecting elements such as exposed cables, wires, or clips contribute to the overall length of the antenna, and are taken into account when choosing the dimensions of traces, as would be known.

Where a wireless device is capable of communicating at more than one frequency, the length of trace 302 is based on the relationship of those frequencies. That is, multiple frequencies can be accommodated provided they are related by fractions of a wavelength. For example, the $\lambda/4$ length for one frequency corresponds to $3\lambda/4$ or $\lambda/2$ for the second frequency. Such relationships for using single radiators for multiple frequencies are well understood in the art.

The thickness of trace, or traces, 302 is usually on the order of a small fraction of the wavelength, in order to minimize or prevent transverse currents or modes, and to maintain a minimal antenna size (thickness). The selected value is based on the bandwidth over which the antenna must operate, as is known in the art of antenna design. The width of trace 302 is also less than a wavelength in the dielectric substrate material, so that higher-order modes will not be excited.

The total length of trace 302 is approximately $\lambda/4$, but it should be noted that the trace can be folded, bent, or otherwise redirected, to extend back along itself so that the overall antenna structure is much less than $\lambda/4$ in length. The conductor, support substrate, and total length dimensions combine to provide a significant reduction in overall antenna size as compared to conventional strip or patch antennas, thereby making it more desirable for use in personal communication devices. For example, compare this to a conventional microstrip antenna ground plane which is at least $\lambda/4$ in dimension, in order to work properly.

As shown in FIGS. 3a and 3c, a conductive pad 308 is positioned in signal feed region 306 and electrically coupled or connected to trace 302. Generally, pad 308 and trace 302 are formed from the same material, possibly as a single structure, using the same manufacturing technique, although this is not required. Pad 308 simply needs to make good electrical contact with trace 302 for purposes of signal transfer without adversely impacting antenna impedance or performance.

In some configurations, the trace faces away from a circuit board or signal sources or receivers, and the substrate is positioned between the trace and the board. Here, conductive pad 308 is positioned inappropriately for easy access directly from the circuit board, without requiring a wire or other conductor to extend around the substrate. This is more complex than desired. Therefore, as shown in FIG. 3c, a second contact pad 310 may be used on the opposing side of the substrate and conductive vias used to transfer signals through the substrate.

A signal transfer feed is coupled to substrate antenna 300 using pad 308 (and 310) which allows convenient electrical connection and signal transfer through "spring" type, or spring loaded, contacts or clips, the structure of which is known in the art. This simplifies construction and manufacture of the wireless device by eliminating manual installation of specialized connectors or contact structures. This also means the antenna is conveniently replaceable when needed or desired, such as for repair, upgrade, or alteration. As discussed above, the contact structure contributes to the over antenna radiator length, which is taken into account in choosing trace dimensions.

The signal feed couples a signal from a signal processing unit or circuitry (not specifically shown) on circuit board 202 to substrate antenna 300. Note that "circuitry" or signal unit are used to refer generally to the functions provided by known signal processing circuits including receivers, transmitter, amplifiers, filters, transceivers, and so forth.

Figure 4A:
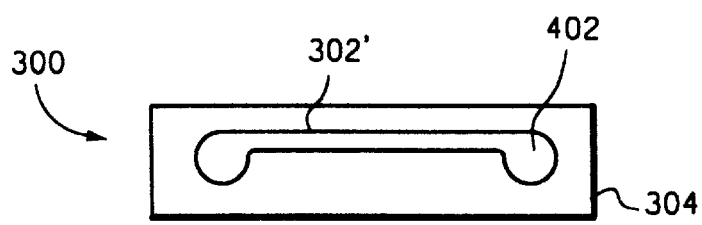
FIGS. 4a–4e illustrate several alternative substrate antenna embodiments.

FIGS. 4a–4e illustrate several alternative embodiments for the traces used in forming an antenna 300 according to the present invention. In FIG. 4a, a trace 302' is shown as a single thin conductive strip that extends along the length of substrate 304 (shown in outline), and is connected to or formed with a rounded contact pad 308 on one end, and having an enlarged or rounded portion 402 formed on the non-contact end. This trace has the appearance of a "dog bone".

Figure 4B:
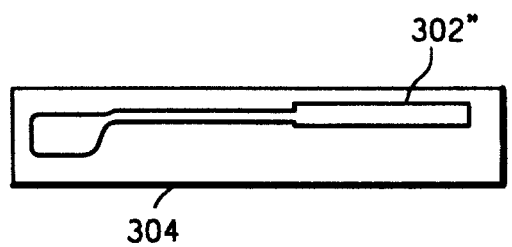
Figure 4C:
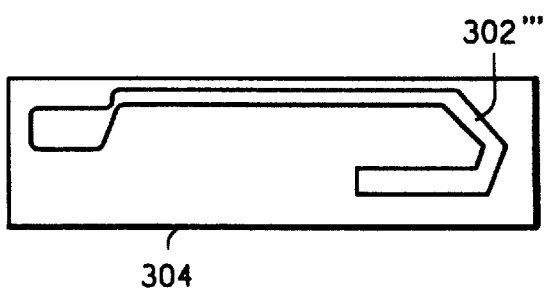

In FIG. 4b, a trace 302'' is formed as a longer thin conductive strip connected to or formed with a more squared contact pad 308. Here, the strip extends along the length of substrate 304. In FIG. 4c, a trace 302''' is formed to also extend along the length of substrate 304 and is then folded or bent near a far non-contact end 404, so that it is redirected back toward the contact pad. This allows the antenna to have a shorter overall length than that of the trace used to form a $\lambda/4$ length element. As stated below, it should be understood that a variety of patterns or shapes can be used in redirecting or folding the trace along different directions. For example, square corners, circular bands, or other shapes can be used for this function, without varying from the teachings of the invention. The trace is also wider in the folded back portion than in the other portion. The increased width, as in FIGS. 4b and 4c, provides "top loading" or improved bandwidth for the antenna, which will be useful for some applications. However, this extra width is not required by the invention.

Figure 4D:
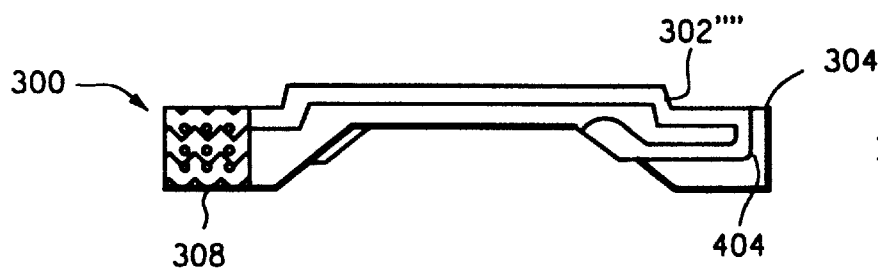

In FIG. 4d, a trace 302'''' trace assumes a more complex shape following the edge of the substrate which has been manufactured with a tab or protrusion along one edge and a corresponding inset or depression on the opposing edge. Such tabs and other angles and depressions along the length of the substrate serve to interface with the sides or features of the wireless device housing and various support elements. That is, the edges of substrate 304 can be shaped in, or take on a variety of shapes, to fit within a housing. The edges can be shaped to mate with or be positioned around corresponding variations in the walls of the housing and to circumvent various bumps, extrusions, irregularities or known protrusions from surfaces of the housing walls, or to even leave gaps for wires, conductors and cables that need to be placed in the wireless device. The sides or edges of the substrate can use a variety of rounded, square or other shapes for this purpose. Note a space 406 between the end of the trace where it is folded back and the edge of the substrate which serves to set the trace back from the edge of the antenna.

Furthermore, the shape of trace 302 (302', 302'', 302''', 302'''') or substrate antenna 300 can also vary in a three dimensional sense. That is, while traces are formed as generally planar surfaces, the substrate, or substrate surface, can be curved or bent to accommodate various mounting configurations. That is, the substrate can be manufactured as a curved or bent structure, variable surface, or simply by being deformed during installation due to its generally thin but strong nature. It will be clear to those skilled in the art that various curves or bends can be used in this dimension. For example, the substrate surface could form a "meandered" pattern of some sort as well.

Figure 4E:
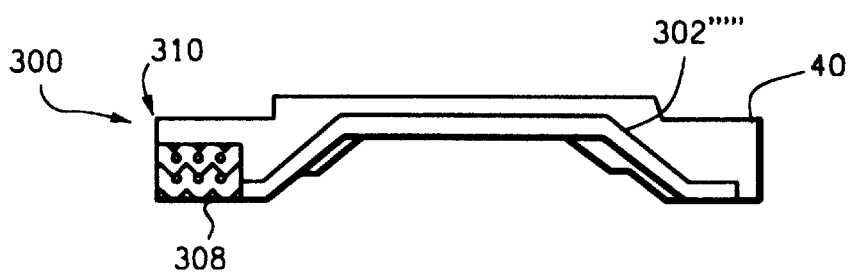

A preferred embodiment for the substrate antenna when used in the phone of FIG. 1, which was constructed and tested, is shown in the front plan view of FIG. 4e. Here, substrate 304 was made approximately 52 millimeters in overall length with a trace width of about 1 mm. In this configuration, it was not desired to fold back a portion and the width was substantially uniform without widening. Contact pads 308 and 310 (on the opposing surface) were both made about 4.5×6 mm square with a series of appropriate conductive vias extending through the substrate to connect the two. A fiberglass substrate was used which was about 1 mm in thickness, and the traces and pads were about 0.01 mm thick.

Figure 5A:
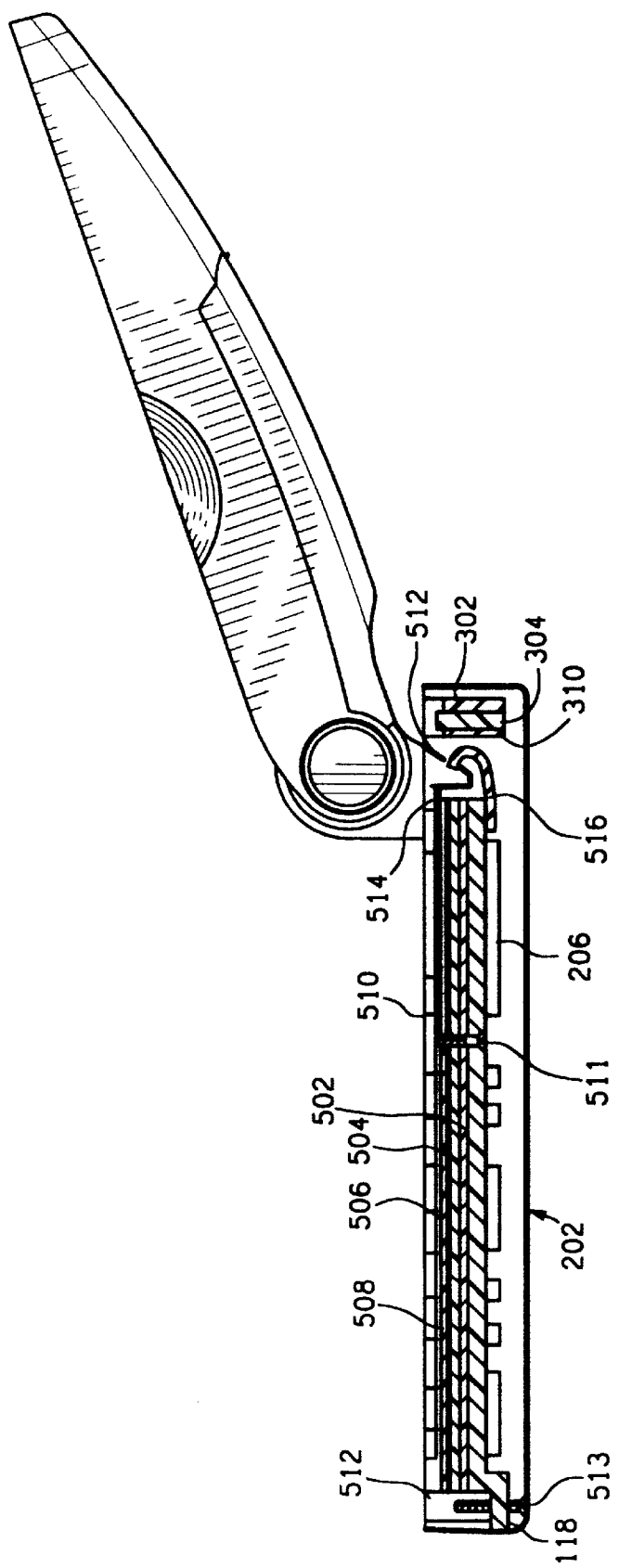
FIGS. 5a and 5b illustrate side cross sectional and rear views of the phone of FIG. 1b using a substrate antenna.
Figure 5B:
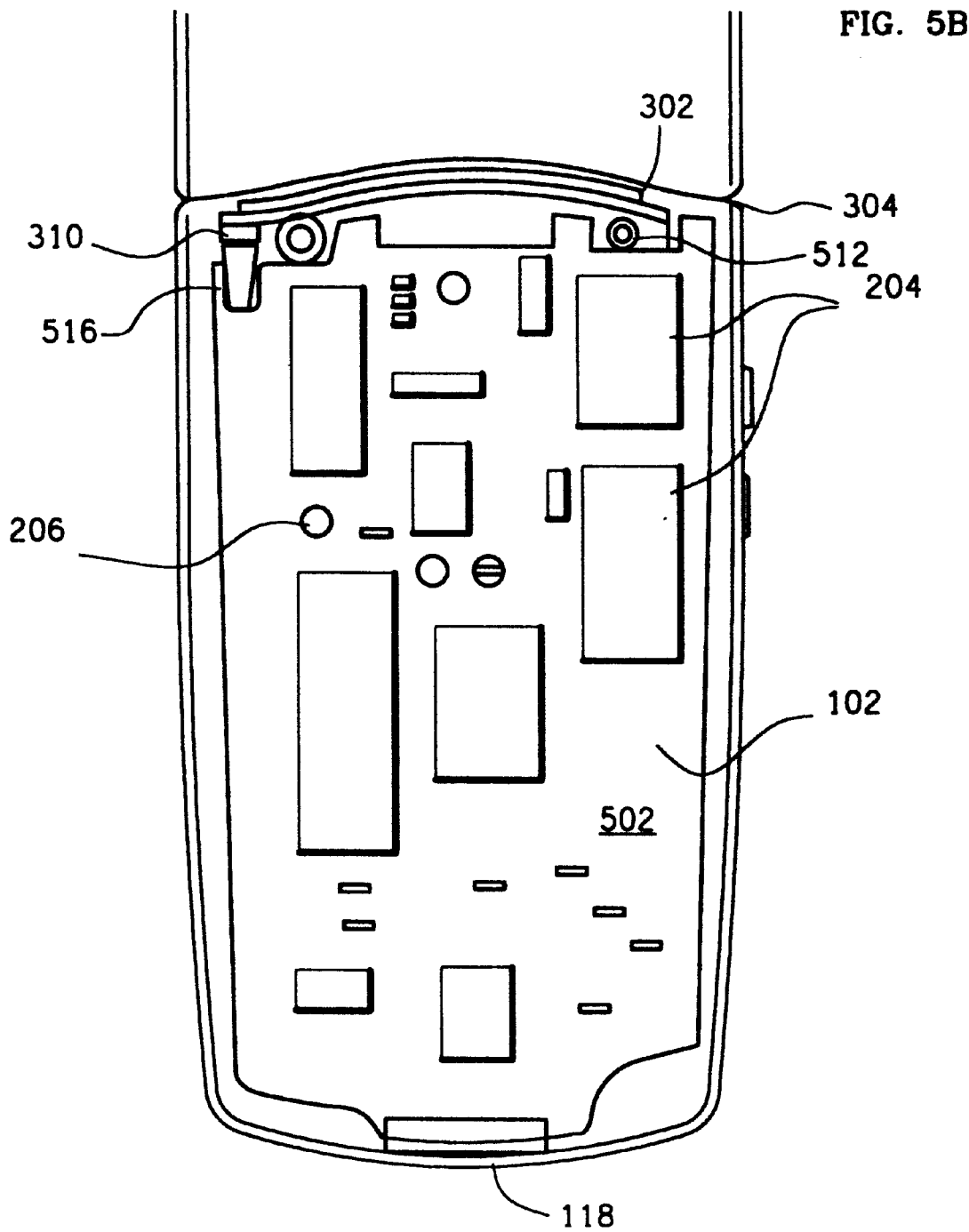

In FIGS. 5a and 5b, antennas 104 and 106 have been replaced by substrate antenna 300. Circuit board 202 is shown in FIG. 5a as comprising multiple layers of conductive and dielectric materials, such as copper and fiberglass, forming what is referred to in the art as a multi-layer board or printed circuit board (PCB). This is illustrated as dielectric material layer 502 next to metallic conductor layer 504 next to dielectric material layer 506 next to or supporting metallic conductor layer 508. Conductive vias (not shown) are used to interconnect various conductors on different layers or levels with components on the outer surfaces Etched patterns on any given layer determine interconnection patterns for that layer. In this configuration, either layer 504 or 508 could form a ground layer or plane, as it is commonly referred to, for board 202, as would be known in the art.

Antenna 300 is mounted adjacent to circuit board 202, but is offset from the ground plane and placed with substrate 304 substantially perpendicular to the ground plane. This arrangement provides a very thin profile for antenna 300, allowing it to be placed in very confined spaces and near the surface of housing 102. For example, antenna 300 can be positioned between fastener or mounting posts and the side (top) of housing 102, something not achievable using convention microstrip antenna designs.

As an option, such posts can now be used to automatically position and support antenna 300 without requiring additional support mechanisms or attachments. This provides a very simple mounting mechanism or means of securing the substrate in place, reducing labor costs for installation of the antenna and potentially allowing automated assembly. In the alternative, substrate 304 can be secured in place using small brackets, or using posts, bumps, ridges, slots, channels, or the like, formed in the material used to manufacture the walls of housing 102. That is, such supports are molded, or otherwise formed, in the wall of the device housing when manufactured, such as by injection molding. These support elements can then hold substrate 304 in position when inserted against, between, or inside of them, or using fasteners attached to them, during assembly of the phone. Other means for mounting are the use of adhesives or tape to hold the substrate against a side wall or some other portion or element the wireless device.

As seen in FIG. 5b, substrate 304 can be curved or otherwise bent to closely match the shape of the housing or to accommodate other elements, features, or components within the wireless device. The substrate can be manufactured in this shape or deformed during installation. Using a thin substrate allows the substrate to be flexed or bent when installed, providing tension or pressure by the substrate against adjacent surfaces. This pressure acts to generally secure the substrate in place without the need for fasteners. Some form of capturing is then accomplished simply by installing the adjacent circuit board and covers or portions of the housing that are fastened in place. However, there is no requirement to deform or curve the substrate either during manufacture or installation in order for the present invention to operate properly.

Conductive pad 308 is positioned adjacent to and electrically coupled or connected to board 202 using a spring contact or clip 516. Spring contact or clip 516 is mounted on circuit board 202 using well known techniques such as soldering or conductive adhesives. Clip 516 is electrically connected on one end to appropriate conductors or conductive vias to transfer signals to and from one or more desired transmit and receive circuits used within the wireless device, which are to be coupled to antenna 300. The other end of clip 516 is generally free floating and extends from circuit board 202 toward where antenna 300 is to be placed. More specifically, clip 516 is positioned adjacent to the end of trace 302 where contact pad 308, or 310, is located. As shown in the figures, clip 516 is bent in a circular or arching fashion which provides a more flexible and simple to work with structure. However, other types of clips, are also known to be useful. Spring contact or clip 516 is typically manufactured from a metallic material such as copper or brass, but any deformable conductive material known for this type of application may be used subject to signal attenuation or other desired contact characteristics, as would be known in the art.

Because antenna 300 is not positioned over or parallel with and immediately adjacent to a ground plane, such as layer 504, the antenna has or maintains a sufficiently large radiation resistance. This means that it is possible to provide appropriate matching for antenna 300 without incurring significant losses, that is, the antenna has a good matching impedance. This efficiency is maintained even if antenna 300 is moved to various positions offset to one side of circuit board 202, that is, it is moved laterally but not closer to board 202.

By locating the antenna adjacent to and above, or beyond the edge of, the ground plane relative to the housing, the antenna provides a very omnidirectional pattern, more so than a conventional whip antenna. This positioning of the antenna also means that the resulting radiation pattern is substantially vertically polarized as desired for most wireless communication devices.

An advantage of the substrate antenna is that it does not require removing part of the ground plane or circuit board, either to be mounted or positioned in place. Large patch antennas or elements require so much real estate or area that they need part of the circuit board removed, or circuits moved, to have a place for mounting. However, it is contemplated that the teachings of the present invention may also provide improvement to the operation of these other types of proposed internal antennas, by reducing noise pick-up and increasing relative bandwidth.

There are three main energy losses impacting the operation of antenna 300 in a wireless device. These are impedance mismatch loss caused by dielectric loading of a user's hand, user head absorption, and user hand absorption. Such energy absorption or mismatch loss can degrade performance. For example, hand or head absorption can significantly attenuate signals being used by the wireless device, thus, degrading performance.

A portion of antenna 300 considered most sensitive to these effects is the open, non-feed, end and adjacent bent sections of trace 302. This portion of the antenna can be located or positioned within the phone housing such that a user's hand will make the least contact or maintain a significant spacing with the hand. This antenna design allows the flexibility in placement within the wireless device to minimize hand absorption, and more importantly to decrease the mismatch loss that can be created by the presence of a hand or other items adjacent to an antenna (except when such a shift is desired).

In order to reduce the effects of hand loading, improve energy distribution, and provide other advantages, the antenna may have conductive shielding positioned next to the antenna traces. For some applications it is desirable to dispose an electrically conductive shielding material adjacent to or around a portion of the substrate antenna. This creates a "shielded" substrate antenna which may have improved radiation characteristics by establishing a zero current near field arrangement with energy being directed into the far field pattern of the antenna. The shielding is typically formed as layers of conductive material that are deposited in planes parallel to and above or below the antenna traces. This is generally accomplished by using additional dielectric substrates or material deposited over the traces and then depositing or coating conductive material over this. Respective shielding layers may also be electrically connected to each other to further increase the shielding along sides of the antenna, using conductive vias, tape, and so forth. A variety of conductive materials, shapes, styles, and sizes can be used to form shielding layers or structures for the antenna. Such an antenna is disclosed in U.S. patent application Ser. No. 09/059,605, entitled "Shielded Substrate Antenna," which is incorporated herein by reference.

Figure 6:
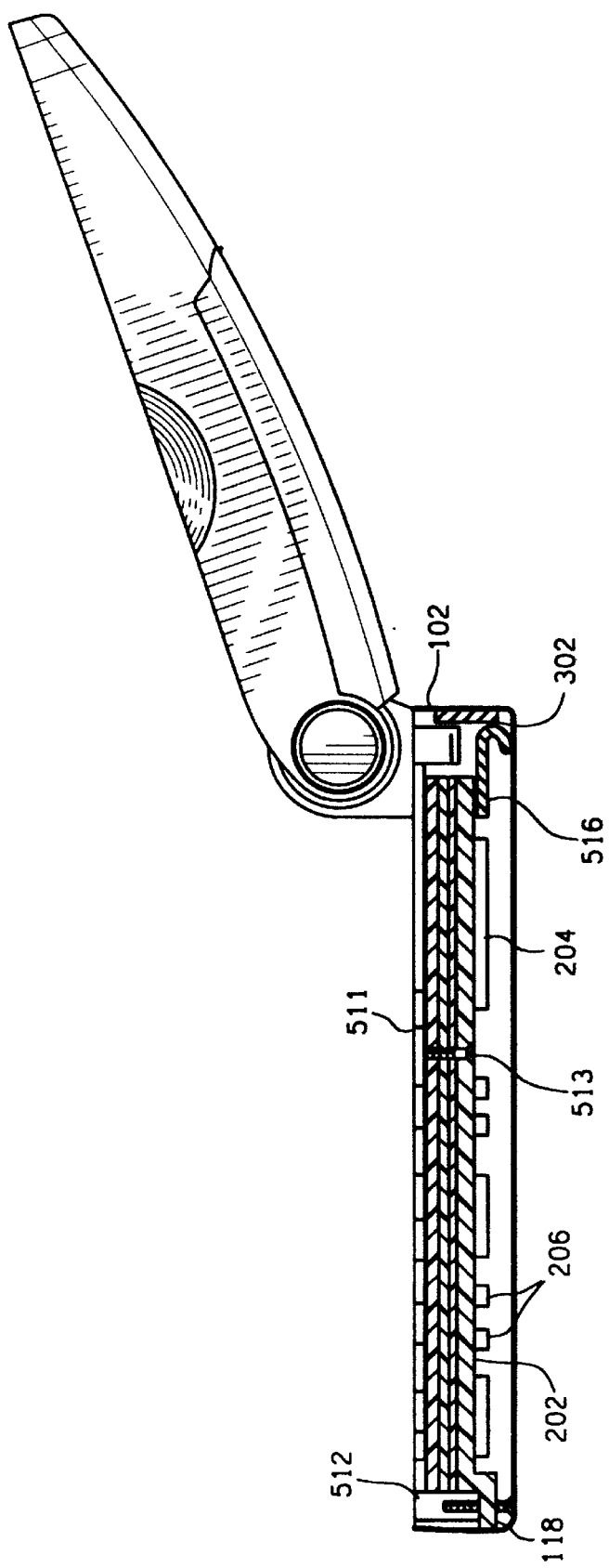
FIG. 6 illustrates a side cross sectional view of the phone of FIG. 1b using an alternate embodiment of a substrate antenna.

To further assist in reducing the antenna size or in allowing flexible placement within housing 102, the antenna can also be formed by positioning or depositing conductive material on the housing or a surface within the wireless device. That is, where there is a relatively clear or unobstructed path along a housing side wall, the trace can be deposited or formed right on the wall. This is shown in the cross sectional side view of FIG. 6 where trace 302 is disposed directly on the housing which acts as a support substrate.

Where the portion of the housing wall to be used is metal coated or is manufactured from a metallic or other electrically conductive material, an intermediate layer of insulating material can be used between the housing and traces 302. In this configuration a metallic layer having the desired trace configuration could be formed on a thin layer of material having an adhesive backing which allows easy placement in the wireless device by simple pressure against the side of the housing. This step could even be automated using "pick and place" machinery known in the art.

However, it will be clear to those skilled in the art, the relative positioning of the antenna or conductive material relative to the ground plane should be the same as discussed above.

Unfortunately, when used in some wireless devices, such as the phone of FIGS. 1*a*–1*b*, there are situations in which the substrate antenna tends to have a lower gain than desired, allows the wireless device to be what is referred to as "de-sensitized" by noise, and exhibits an undesirable energy distribution pattern.

Substrate and other internal antennas by nature are positioned adjacent to a variety of signal sources and conductors which can induce noise or signal pick-up by the antenna. This requires the wireless device to be made less sensitive to eliminate internal noise pick-up (reduced gain) resulting in a lower sensitivity for desired communication signals. An internal antenna also allows energy or radiation to be directed or coupled into undesired modes or directions within the device or circuitry, also reducing achievable antenna gain. At the same time, energy coupling may cause some energy to be undesirably radiated from elements other than the antenna, along a direction toward a device user.

In addition, while a substrate antenna exhibits improved bandwidth, there is a continued interest in wireless device designs having increased bandwidth. This is especially useful for devices used in or across multiple communication systems, in multiple countries, or in different operating "modes" where multiple frequencies are used.

The result is that although the substrate antenna is an internal antenna that can be positioned to minimize the impact of hand loading, and it is less sensitive than prior antennas, additional work is desired to reduce mismatch losses and noise, while improving overall bandwidth and gain. In order to solve these and other problems in certain wireless device configurations, a new parasitic element or patch operating in combination with the substrate antenna has been created. The construction and operation of this element is illustrated below.

Figure 7:
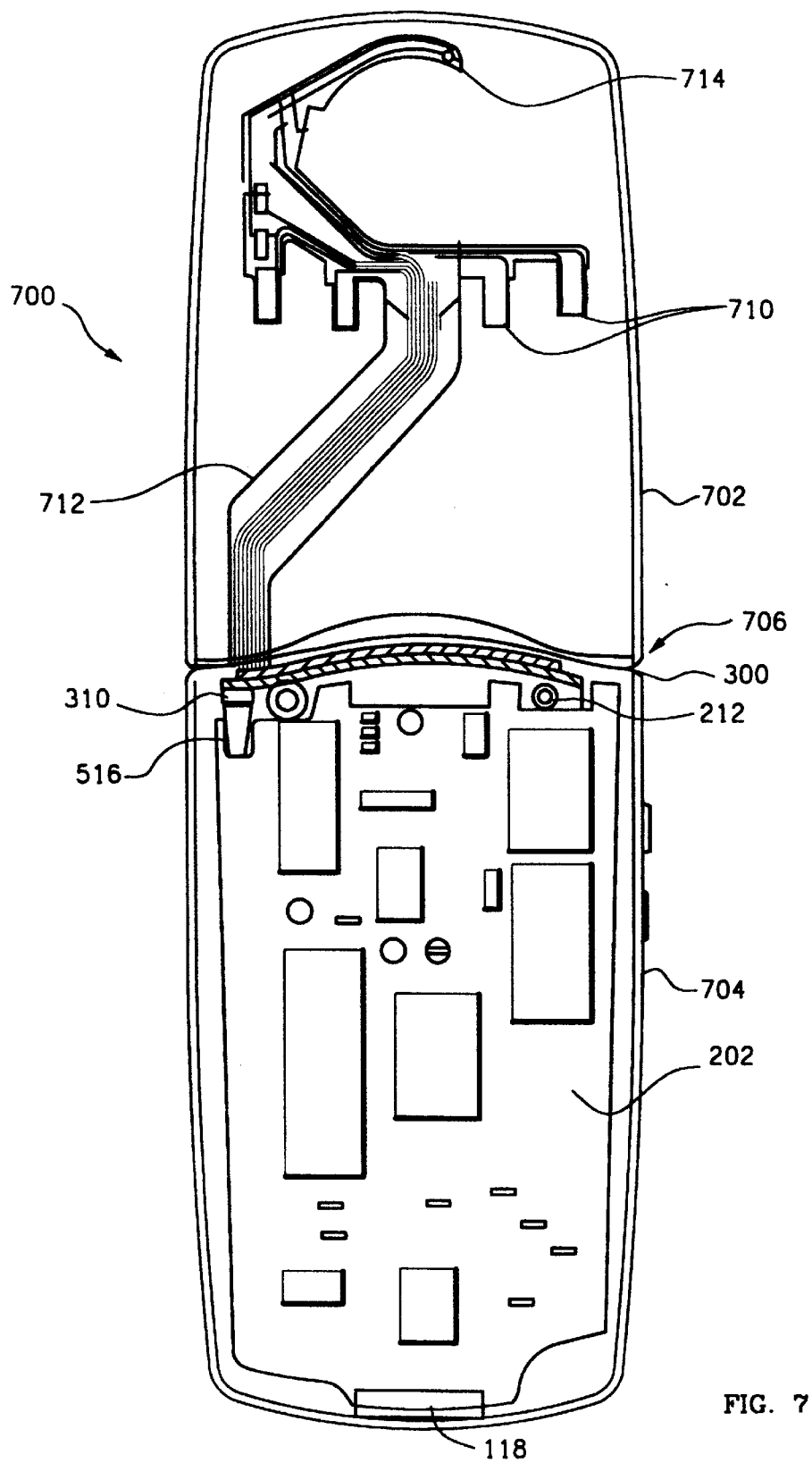
FIG. 7 illustrates the phone of FIGS. 5a and 5b with a series of conductors extending from one portion to another across a rotating joint.

As shown in FIG. 7, a clamshell or folding style wireless device or phone 700 such as seen in FIGS. 1*a* and 1*b*, has an upper housing section or portion 702 and a lower section or portion 704 which are secured together at a rotating joint 706. In this arrangement, upper portion 702 is generally used to support or house the phone speaker 110, possibly a display 112, a battery or power pack 120, and possibly an alert device (not shown), such as a vibrator or special beeper module, all of which are well known in the art.

A flex-cable, flex-line, or very fine, flat, or small flexible conductors or cables are used to transfer power or signals between a set of battery contacts 710, speaker 110, or alerting elements mounted in upper portion 702 and circuit board 202 in lower housing portion 704. However, a variety of known cables or wires can be used within the wireless device to transfer such signals, to and from a variety of known elements, without departing from the teachings of the invention. The signals involved in these types of transfers are very low power and frequency, and generally present no problem to the telephone operation or for a wireless device user. These signals can be in either analog or digital form depending on application and the specific signal.

A set of such conductors in the form of a flat multi-conductor flex-cable 712 is shown in FIG. 7 running from positions just under board 202 across the joint and up to battery contacts 710 and a set of speaker contacts 714. Unfortunately, these conductors run very near at least one end of trace 302 for antenna 300. In the embodiment illustrated in FIG. 7, the conductors are disposed adjacent to the feed portion of antenna 300 and near clip 516, which effectively acts as part of antenna 300, unlike the connectors or contacts for the whip antenna shown in FIG. 2, which are shielded and more remote from such conductors. This results in several problems for the wireless device.

This positioning of the conductors allows electromagnetic fields produced by them to interact with the antenna which acquires or "picks-up" some of the energy from fields around or emanating from the conductors. In addition, signals from other sources can be imposed on or picked-up by the unshielded conductors and transferred to a region near the antenna. The result is that at least some portion of the signals traveling on, or picked-up by, the conductors, is transferred into the antenna. Signals coupled from such conductors into the antenna may be transferred into reception circuitry for the wireless device, where they are amplified. This is undesirable as such signals are not useful communication signals but represent noise. That is, output audio signals intended for a speaker (110), commands or signals used to trigger an alert device, or even signals from battery leads may be imposed on the antenna (300). In addition, some other signals could be intercepted by these conductors, which are unshielded, including output from the antenna or transmission circuitry.

In any case, this noise must be ignored or suppressed in the wireless device. This requires or results in lowering the sensitivity of the device reception circuits in order to account for noise. That is, such circuits must be less sensitive to low level signals (noise) in order not to amplify or feedback such noise into the rest of the processing circuits. Unfortunately, that also results in decreasing or degrading the ability to detect or use lower power "real" desired communication signals. Another more distant side effect is that the communication system may be required to use more power on average to reach some wireless devices which creates greater interference for other system users and decreases overall system capacity.

At the same time, the conductors may be capable of resonating with the fields produced by the antenna to some extent or degree, and a small percentage of the antenna radiation, or energy, is redirected into the conductors. While this effect may be very small compared to the energy or power being transferred through spring clip contact 516, it can still represent a significant loss and impact the operation of the wireless phone in several ways. First, energy redirected from the antenna into some other portion of the phone represents lost power for communication. This translates to more power being consumed from limited resources such as batteries, in order to maintain a particular output power level or budget, as referred to in the art. This has potential impact on both communication quality, and operating or stand-by time available for the phone.

Therefore, the present invention alters the manner in which the conductors are configured in regions surrounding, or adjacent to, the antenna, in order to reduce energy being radiated by or transferred to the antenna by such conductors. Working in concert with a substrate antenna, this technique increases the antenna gain, wireless device reception sensitivity, and antenna bandwidth, improves impedance matching, and decreases undesired radiation.

Figure 8A:
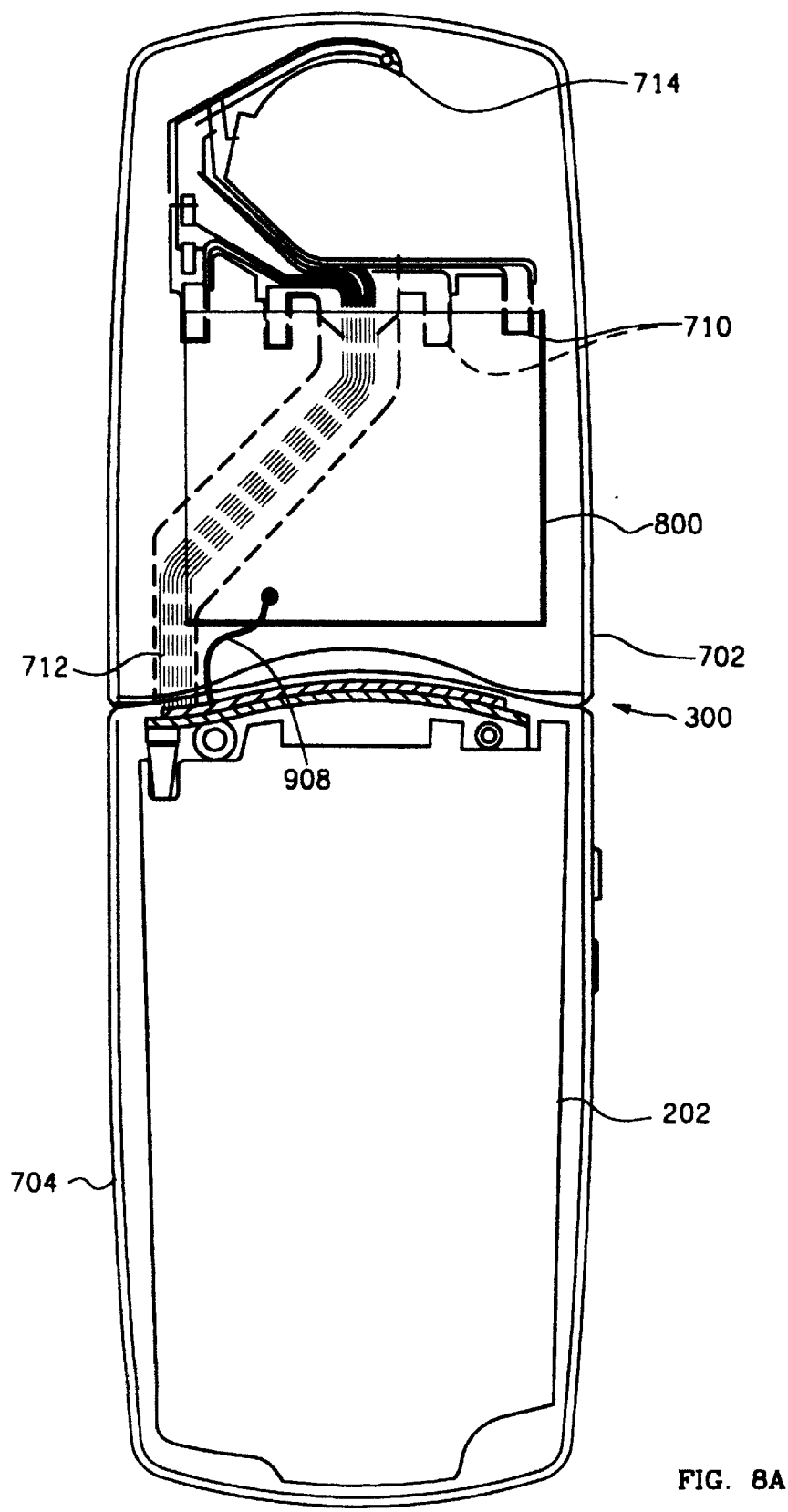
FIG. 8a illustrates a top plan view of a parasitic patch element constructed according to principles of the present invention.
Figure 8B:
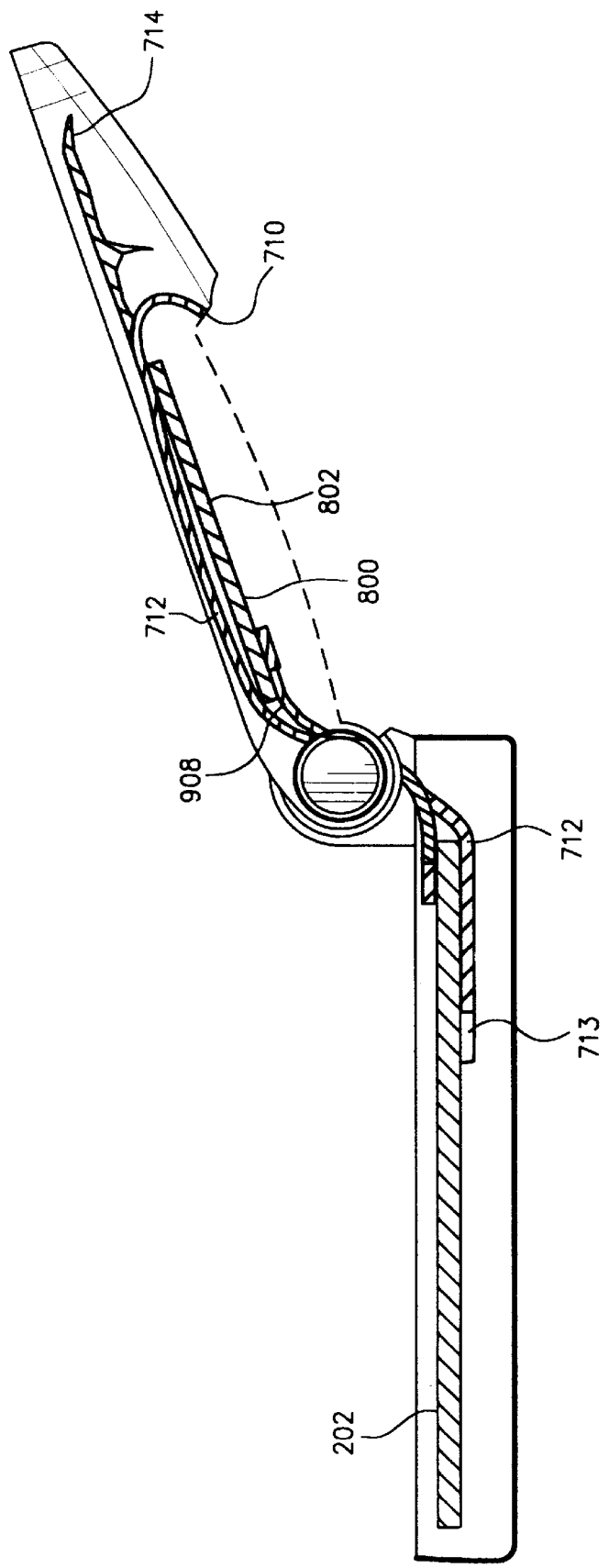

A first embodiment of the invention is shown in the top plan view of FIG. 8a, and side cross sectional view of FIG. 8b. In FIGS. 8a and 8b, and figures that follow, only an outline of circuit board 202 is shown for purposes of clarity in illustration. A thin almost flat wire harness or flex-cable 712 consisting of a series of conductors, extends from one or more connectors on the underside of circuit board 202, or from an upper surface of the board, depending on the specific design. Those skilled in the art are very familiar with this type of conductor assembly and connectors with which it interfaces.

Harness 712 passes near the end of antenna 300 and along an outer surface of upper portion 702. Near the upper end of harness 712, different ones of the conductors extend in different directions or along different paths to connect to each of one or more battery contacts 710, speaker contacts 714, or miscellaneous contacts used for transferring other types of well known signals or voltages. In this configuration, with harness or cable 712 passing immediately adjacent to antenna 300, spurious noise is encountered or coupled into the antenna. This means that the sensitivity of reception circuits or processing elements connected to the antenna must be decreased to reduce the impact of the noise. This results in a corresponding decrease or drop in overall sensitivity for the wireless device to communication signals. The magnitude of this decrease has been determined to be in the range of 3–4 dB, which is quite significant.

In order to minimize or prevent energy coupling between cable 712 and antenna 300, or into the adjacent air around the phone, a parasitic element or patch 800 is used to act as a shielding element or alter the resonant or energy coupling characteristics of the cable, or conductors. At the same time, parasitic element 800 acts to separate charge across the separation, gap or slot between antenna 300 and the ground plane of circuit board 202, this increases the effective or virtual area of the antenna at the frequency of interest. This increases the gain and bandwidth of antenna 300 accordingly. The gain of the wireless device increases by the range of about 0.8 to 1.5 dB.

By parasitically coupling the parasitic element to the ground plane of circuit board 202 using cable 712, further increases in gain and bandwidth of the wireless device can be obtained. This can cause the gain to increase by a factor of about 0.8 to 1.5 dB. The parasitic element and parasitic coupling increases the bandwidth of the wireless devices by a factor of at least about 1.5. Alternatively, the parasitic element can be coupled to the ground plane using a conductor such as wire 908, discussed further below, as desired.

Parasitic element or patch 800 is manufactured from a conductive material such as, for example, copper, brass, aluminum, silver, gold, or other conductive materials or compounds known to be useful in manufacturing antenna elements. This could include conductive materials embedded within plastic, resins, or conductive epoxies.

The material for creating the parasitic element may be applied using one of several known techniques such as, but not limited to, depositing metallic or conductive material on a plastic support element or substrate which is then mounted in place. In the alternative, a thin plate or foil of conductive material or metal can be used, which is secured in place such as by taping or using adhesive compounds. The material itself may be formed as a thin metallic tape or "sticker" like material which is sized appropriately and then pressed in place over harness 712. That is, thinner and more flexible elements are held in place using a variety of known means, such as adhesive compounds or tapes. Thicker material or patch elements are generally held in place using clips, screws, or snaps, especially if the patch is also mounted on a substrate for easy transport and removal for servicing harness 712. It is also possible to use standard plating or other deposition techniques to coat a layer of conductive material over the cable and surface of the wireless device housing. This includes using conductive material in liquid form, similar to that discussed for manufacturing the substrate antenna.

In addition, while patch element 800 is illustrated as a single layer of conductive material, the present invention is not limited to this configuration. For example, as shown by layer 802 in FIG. 8b multiple layers of material can be used to cover specific areas or to achieve a desired overall thickness for the parasitic element based on the frequency or magnitude of energy to be blocked. Multiple layers can be used to achieve a particular complex shape or to simplify manufacture. Multiple layers of material may also be deposited on or interleaved with other materials such as a supporting substrate. Alternatively, multiple layers are used where a patch or conductive layer is to be positioned on opposing sides of, or interleaved with, conductors, as opposed to being positioned on a single side.

The parasitic element is mounted to cover at least a significant portion of the cable or harness. There tends to be no exact percentage of the cable that must be covered, but rather it is based on the amount of the energy coupling or re-radiation that is to be prevented or minimized in a given application. It is preferred that the entire length of the cable be covered, especially in the region under or adjacent to the internal antenna. The width of the parasitic element is at least twice that of the cable or conductor set being covered, in order to inhibit field coupling with the antenna.

Those skilled in that art will be aware of the amount of noise they desire to suppress for a given wireless device design, or the amount of noise that is present and should be countered in order to achieve a preselected target sensitivity value for the device. They will also be aware of the factor by which it is desirable to increase the effective antenna area and corresponding gain and bandwidth, for particular device applications. These factors are used to select particular dimensions for the patch elements.

In FIGS. 8a and 8b, parasitic patch 800 is shown as covering the entire region between joint 706 and battery contacts 710. While this arrangement is preferred as one which is more likely to work or have the desired effect, the patch need not always be this large to work properly, or improve the operation of the wireless device.

Figure 9A:
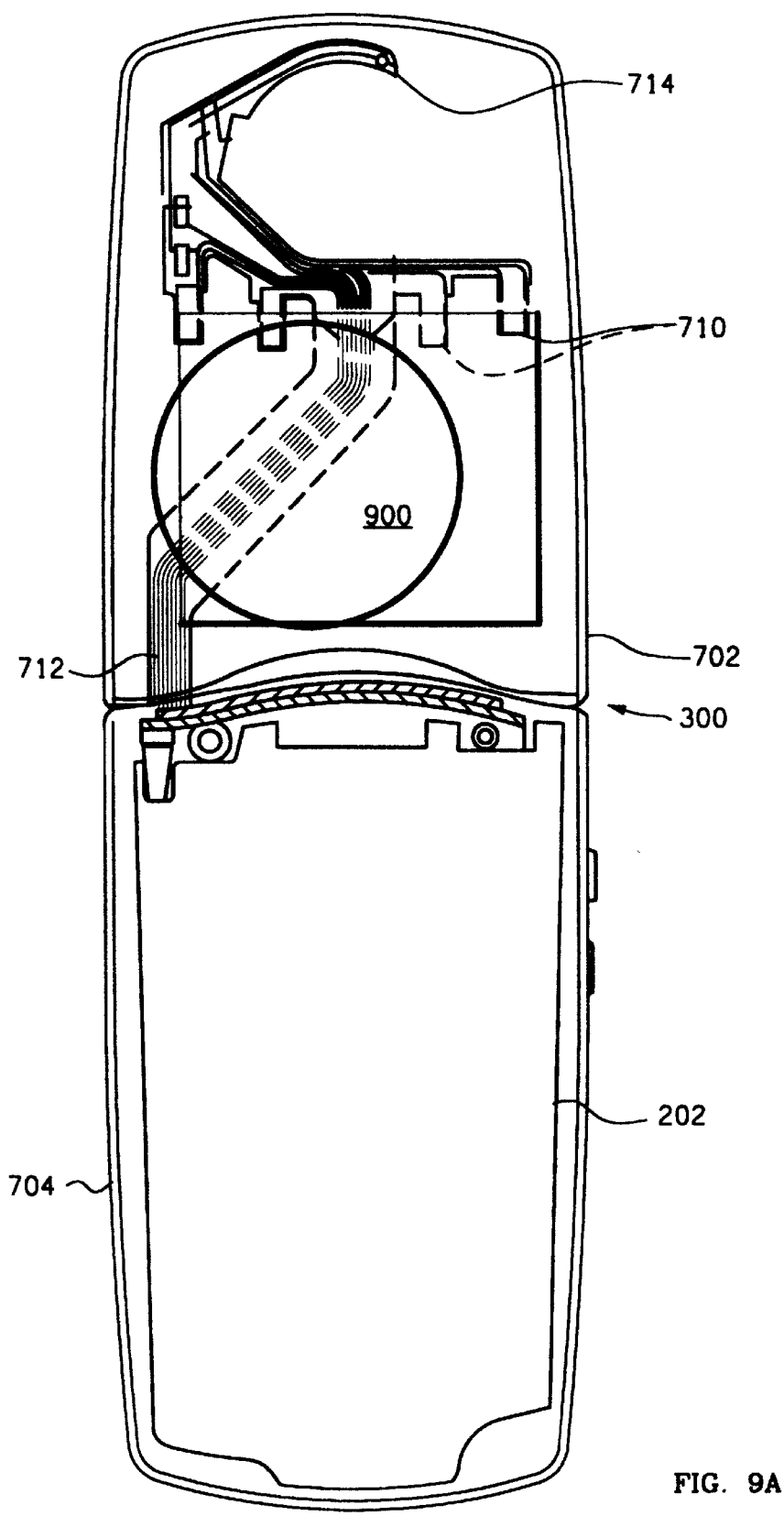
FIGS. 9a–9d illustrate plan views of alternative embodiments for the parasitic patch of FIGS. 8a and 8b.

The parasitic element shown in FIGS. 8a and 8b employs rectangular or square shape or overall outline. However, as long as an appropriate amount of the cable is covered, patch element 800 can assume a variety of other shapes or configurations. Alternative embodiments or configurations for the parasitic patch element of FIGS. 8a and 8b are shown in the plan views of FIGS. 9a–9d. In FIG. 9a, a parasitic element 900 is shown using a circular or elliptical in shape; in FIG. 9b, a parasitic element 902 uses triangular in shape; in FIG. 9c, a parasitic element 904 uses a more elongated shape with circular edges; and in FIG. 9d, a parasitic element 906 has a more complex series of rectilinear and angular edges or sides.

Figure 9B:
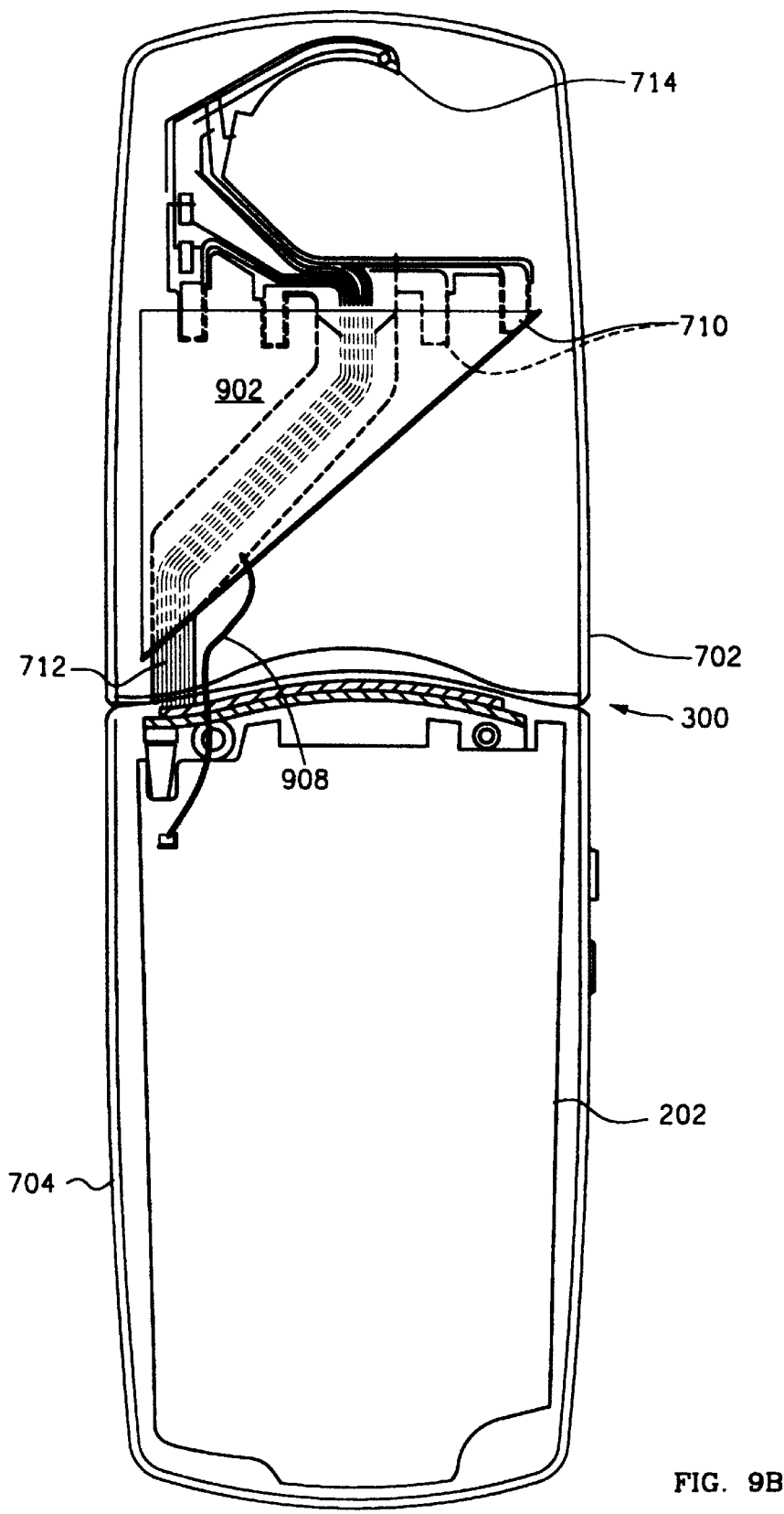
Figure 9C:
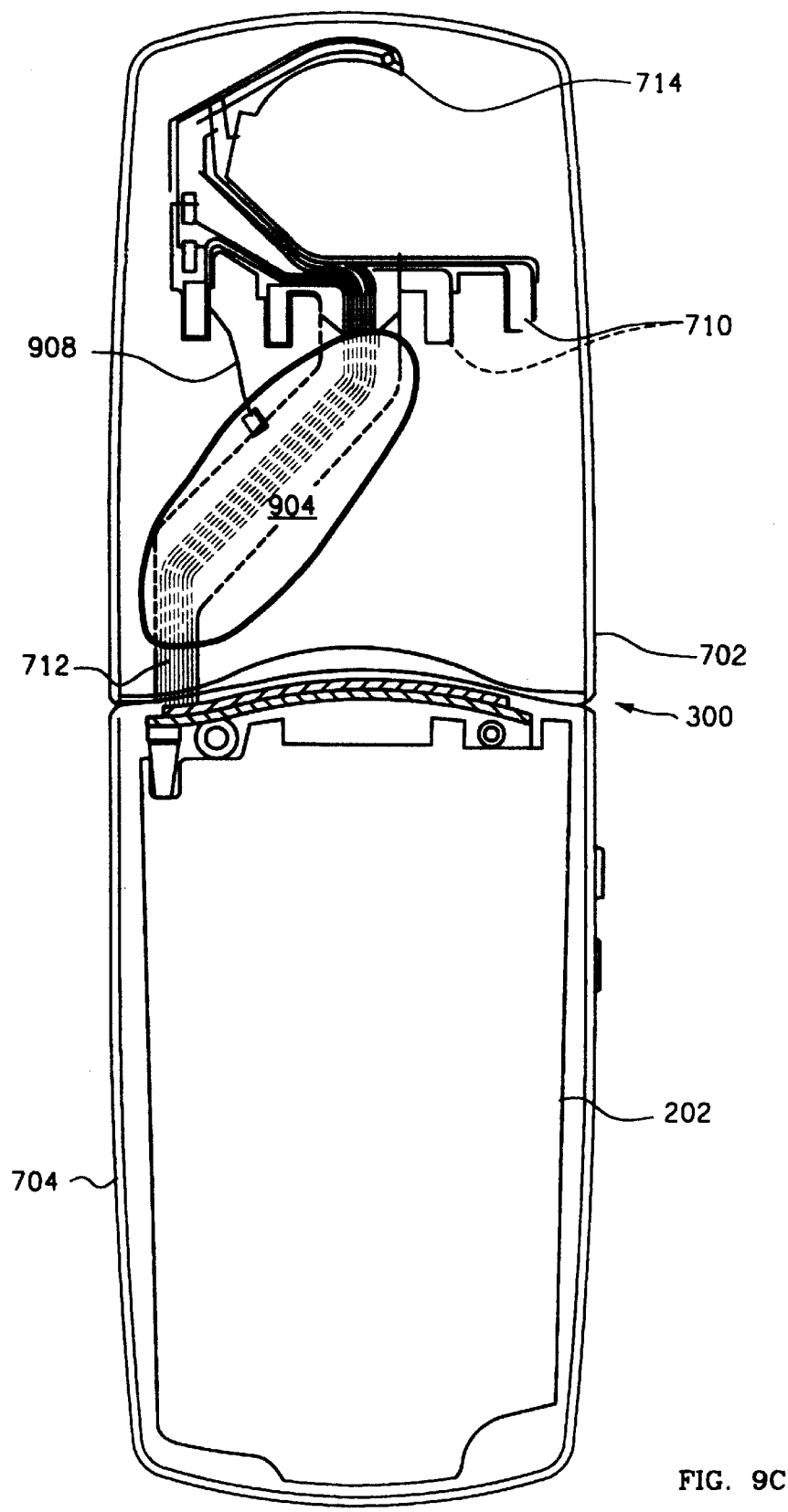
Figure 9D:
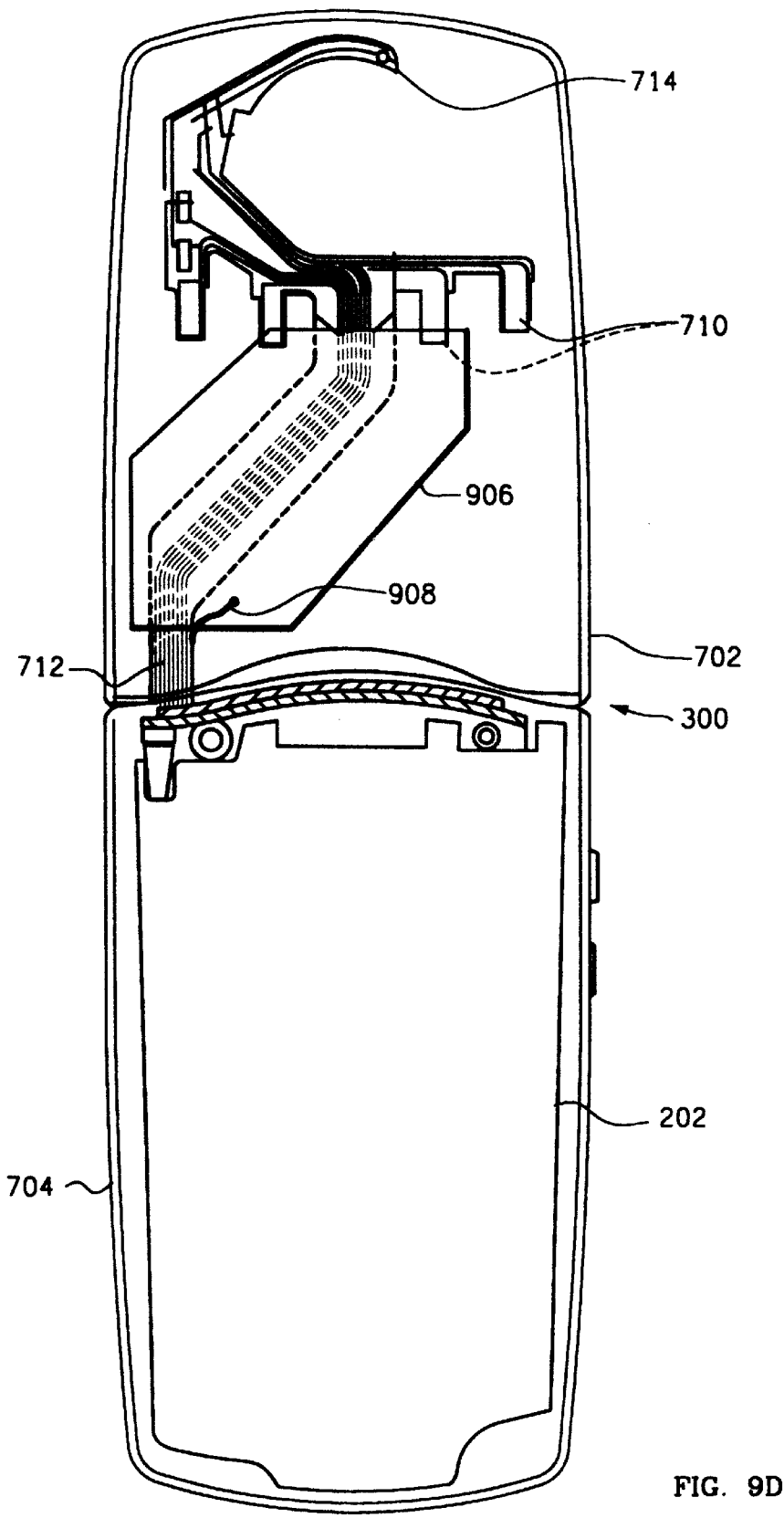

In each of the figures, the parasitic element (800, 900, 902, 904, and 906) is shown as being connected or coupled to ground for the wireless device. Here, that ground is located on and is the ground plane of circuit board 202, but that need not be the only case. In FIG. 9a this coupling is shown as being parasitic, with signals being coupled to the ground through one of the cables running with or forming part of harness 712. In FIGS. 9b, 9c, and 9d this coupling is shown as using a wire, cable, or similar conductor 908. In FIG. 9b a conductor 908 connects to the ground plane in circuit board 202 through a connector 910. In FIG. 9c conductor 908 connects to a ground lead for the battery terminals 710 and in FIG. 9d conductor 908 connects to the ground plane in circuit board 202 through one of the conductors in harness 712. The connection of the parasitic element to grounding conductor 908, or harness 712 or board 202, can be accomplished using a variety of well known connection techniques or devices such as, but not limited to, soldering, conductive adhesives or potting compounds, wire clips, tabs, crimped material, or known electrical connectors. In some applications, the conductor can have a contact surface on one end that is simply pressed against the parasitic element using other fasteners, posts or the like within the wireless device. The area or dimensions of parasitic element 800 can also be adjusted in view of the frequencies of anticipated or expected signals that are to be reduced or eliminated by the parasitic element.

In FIGS. 8a, 8b, and 9a–9d parasitic element 800 is shown being positioned over the harness or cable relative to the front and back of the phone. That is, the cabling or harness is mounted in place first during assembly of the phone, and the patch element is positioned over the harness later. However, the patch could be installed first and the harness second. This has the advantage of having the harness in a more serviceable position without necessitating removal of the patch. This also provides for a potentially more easily automated placement or deposition of the patch material during phone manufacturing.

In addition, while only one patch element is illustrated in FIGS. 8a, 8b, and 9a–9d, the present invention is not limited to this configuration. For example, multiple patches can be used to cover specific areas where radiation coupling is most severe, or easier to control. Multiple patches can be used to achieve a particular complex shape or to simplify installation. Alternatively, multiple patches could also be used where a patch or conductive layer is to be positioned on opposing sides of conductors, as opposed to a single side.

One embodiment for the parasitic patch element described above was manufactured in the form of a thin metallic "sticker" which measured approximately 51 mm by 41 mm in size, and was placed over a flex-cable structure in a wireless phone. An internal antenna in the form of a shielded substrate antenna having the dimensions discussed above in relation to FIG. 4d was employed within the phone. The result of using the inventive parasitic element was an approximate increase in gain for the wireless phone of about 2–3 dB, and an increase in antenna bandwidth by a factor of about 1.8, or an increase of about 80 percent. In addition, the impedance matching with other elements being connected to the antenna was improved, which reduced mismatch losses. These results clearly indicate that the new parasitic patch element decreases the impact of noise, increases bandwidth, and provide other features and effects that make it very useful for application in wireless communication devices.

The physical benefits and results of using an internal antenna according to one of the embodiments of the invention, and removing both whip antenna 104 and helical antenna 106 is readily apparent in the side plan view of FIG. 5c. In FIG. 5c, a phone 100' is shown which is the same as the phone of FIG. 1b but using the present invention instead of antennas 104 and 106. In this configuration, a housing 102' has been manufactured without the openings normally associated with external antennas, providing a more aesthetic appearance.

The previous description of the preferred embodiments is provided to enable any person skilled in the art to make or use the present invention. The various modifications to these embodiments will be readily apparent to those skilled in the art, such as the type of wireless device in which used, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A parasitic element for use with an internal substrate antenna in a wireless communication device having one or more signal or power transfer conductors or signal feeds located adjacent to said antenna, wherein said substrate antenna comprises:

one or more conductive traces supported on a dielectric substrate having a predetermined thickness;

said supporting substrate is mounted offset from and generally perpendicular to a ground plane associated with the wireless device; and said parasitic element comprises:

at least one layer of conductive material disposed adjacent to one or more of said conductors in a region adjacent to said antenna, having a pre-selected width relative to said conductors, and a pre-selected length along said conductors sufficient to prevent energy from being coupled between said antenna and conductors in the region of said layer.

2. The parasitic element of claim 1 wherein said layer of conductive material is positioned either over or under one or more of said conductors.

3. The parasitic element of claim 1 wherein said one or more conductors extend between preselected signal processing elements of the wireless device and power sources and have a portion located immediately adjacent to said substrate antenna.

4. The parasitic element of claim 1 comprising at least two layers of conductive material.

5. The parasitic element of claim 1 wherein said preselected width is least twice as wide as said conductors.

6. The parasitic element of claim 1 wherein said at least one layer of conductive material comprises a patch of thin electrically conductive material placed over the conductors adjacent to the substrate antenna.

7. The parasitic element of claim 6 wherein said patch is parasitically coupled to a ground plane of said wireless device.

8. The parasitic element of claim 6 wherein said patch has a substantially rectangular shape.

9. The parasitic element of claim 6 wherein said patch has a substantially circular shape.

10. The parasitic element of claim 6 wherein said patch has a substantially triangular shape.

11. The parasitic element of claim 6 wherein said patch has a complex geometric shape.

12. The parasitic element of claim 1 wherein said conductive material is configured in size to reduce a substantial portion of energy from coupling between said conductors and substrate antenna by altering the resonant or energy coupling characteristics of the conductors.

13. The parasitic element of claim 1 wherein said conductive material is configured in size to increase the effective area and corresponding gain and bandwidth of said substrate antenna by preselected amounts.

* * * * *